P. E. WELTON.
FEED MECHANISM FOR MIXING MILLS.
APPLICATION FILED MAR. 10, 1913.

1,134,172. Patented Apr. 6, 1915.

Witnesses
E. B. Gilchrist
N. C. Hubbard

Inventor
Park E. Welton
by Thurston & Kwis
attorneys of the supports G, G, a fluid pressure cylin-
UNITED STATES PATENT OFFICE.

PARK E. WELTON, OF AKRON, OHIO, ASSIGNOR TO KATHARINE B. WELTON, OF AKRON, OHIO.

FEED MECHANISM FOR MIXING-MILLS.

1,134,172. Specification of Letters Patent. Patented Apr. 6, 1915.

Application filed March 10, 1913. Serial No. 753,157.

*To all whom it may concern:*

Be it known that I, PARK E. WELTON, a citizen of the United States, residing at Akron, in the county of Summit and State of Ohio, have invented a certain new and useful Improvement in Feed Mechanism for Mixing-Mills, of which the following is a full, clear, and exact description.

The object of this invention is to provide a novel endless belt feeding mechanism for returning to mixing rolls the rubber composition which has been passed between them, whereby the mixing operation will be substantially continuous until completed.

The object of the invention is to provide efficient, durable and easily operated mechanism by which said belt may be rendered operative, or may be moved out of the way as required.

The invention consists in the construction and combination of parts hereinafter described and pointed out definitely in the claims.

Figure 1:
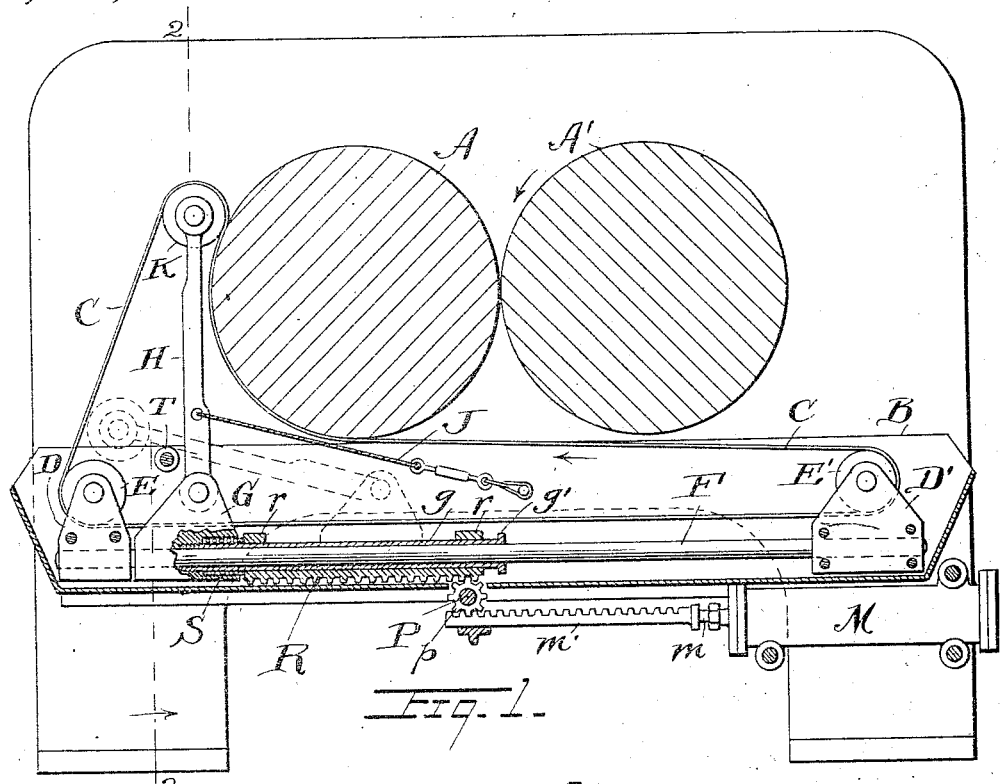
Figure 2:
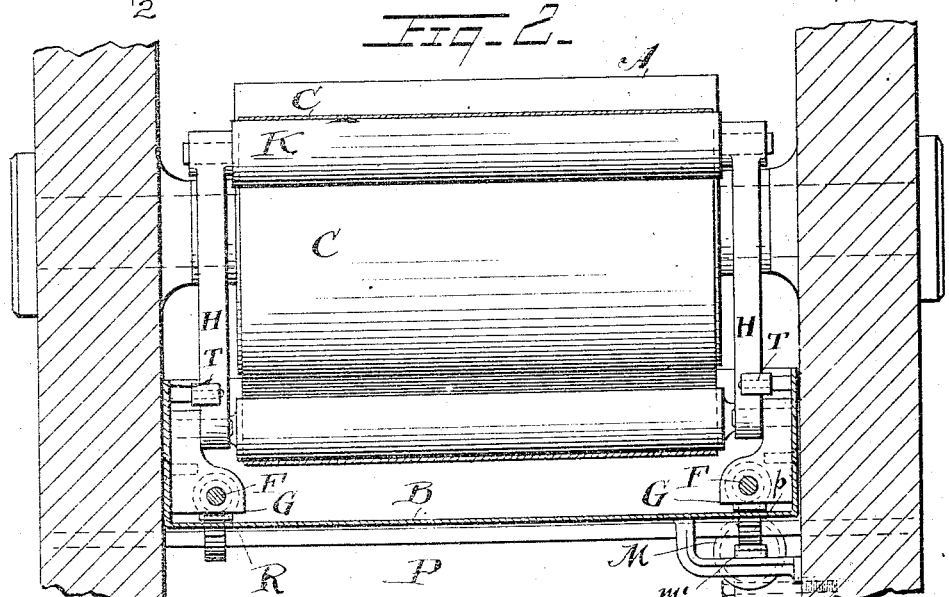

In the drawing, Figure 1 is a longitudinal sectional view of the invention placed in operative relation with conventionally shown mixing rolls of the usual construction. Fig. 2 is a sectional end elevation of the mechanism shown in Fig. 1.

Referring to the parts by letters, A, A¹ represent the mixing rolls of an ordinary rubber mixing mill. No attempt has been made to show the mechanism by which they are operated, because that is no part of the present invention. It must be assumed, however, that suitable mechanism is associated with these rolls to cause them to turn at the proper rate in the directions indicated by the arrows placed on said rolls.

B represents a pan which is secured in place beneath said rolls. Its main function is to support the feeding mechanism; but it is made pan shape in order to be better suitable to serve the purpose of catching the mixed rubber when that is allowed to drop from between the rolls.

At each end of the pan are two fixed bearing brackets D, D¹,—and in these are mounted the two apron rolls E, E¹ whose axes are parallel with the axes of the rolls A, A¹.

On each side of the pan is a longitudinally extended guide rod F which is secured at its ends to the two brackets D, D¹ on that side of the machine. Two supports G, G, are slidably mounted on these rods respectively as guideways. To each support G an arm H of a roller carrying frame is pivoted on an axis parallel with the axes of the mixing rolls. An idler roll K is mounted on a parallel axis in the outer ends of the two arms H. The endless apron C runs over all three of the rolls,—that is to say, over the rolls K, E and E¹. A cable J of the proper length is secured at one end to each arm H, and at the other end to an adjacent side of the pan. A roller T is mounted on each side of the pan in a position to engage the two arms H, H,—and support them when the cable J does not.

When the supports G, G, are moved to the left toward the position shown in Fig. 1, the arms H, because of their engagement with rollers T, will be swung up into the position shown in Fig. 1, whereby apron C is brought into contact with roll A for something more than one-quarter of the circumference of the latter. At this time the cables J will become taut and will pull on the arms H, H and so hold the belt tightly against the roll A. Because of this contact the apron C will be caused to move in the direction indicated by the arrow placed adjacent to it. The partially mixed rubber compound passes down between the two mixing rolls, and will fall onto or be carried into contact with this apron, and will be by it carried around the roll A as far as the apron is in contact with said roll. The rubber compound will adhere to the roll, so as to be carried by it over the top and down again between the rolls A and A¹.

When the rubber compound has been passed between the mixing rolls times enough to effect a thorough mixture, the two supports G are then to be moved to the right, as shown in Fig. 1, and thereby the arms H and the roller K will be caused to assume the positions indicated by dotted lines in said figure. The rubber compound coming down between the two rolls will now drop onto the apron and may be easily removed therefrom, because the apron and roller K and its supporting frame, are in such position that they do not interfere with such removal.

In order to produce the stated movements of the supports G, G, a fluid pressure cylinder M containing a piston is fixed in suitable relation to the pan substantially as shown. The piston rod $m$ has fixed to its outer end a rack $m^1$ which is held in engagement with a pinion $p$ fixed to a shaft P located with respect to the pan substantially as shown. Connected with each support G and extending to the right therefrom is a sleeve $g$ which embraces the associated rod F. Slidably embracing this sleeve are the two eyes $r, r$, which are rigid parts of a rack R which engages with a pinion which is likewise fixed to shaft P. On one side of the machine the rack may be engaged with the same pinion $p$ with which rack $m^1$ engages.

At the outer end of sleeve G is a flange $g^1$ between which and support G the rack structure R is permitted some independent movement. Between each rack structure and the associated support G is a compressible coil spring S which, by acting to move them apart, yieldingly holds roller K and apron C in contact with roll A. By admission of any fluid under pressure into cylinder M at the proper end thereof the piston rod $m$ may be caused to move outward or inward, as required, with the result of moving the two rack structures R; and then, in turn, by engaging with the shoulders $g^1$ or with the springs S, and through them with supports G, will move the said supports to and from the two positions shown by the full and dotted lines in Fig. 1.

Having described my invention, I claim:—

1. In combination with a pair of mixing rolls, two apron rolls mounted in fixed bearings, a frame, supports to which the lower end of said frame is pivoted, a roller mounted in the outer end of said frame, means for moving said supports, a roller for engagement by one of the side members of said frame, a cable secured to said frame and to a fixture, and an endless feed apron which embraces the three apron rolls.

2. In combination with a pair of mixing rolls, two pairs of fixed brackets located in a plane below said rolls, a pair of supports located near one pair of fixed brackets and movable toward and from the same, a frame pivoted to said supports, a roller mounted in the free end of said frame, a cable fixed at one end to said frame and at the other end to a fixture, means for moving said movable supports, and an endless apron which embraces the three rollers.

3. In combination with a pair of mixing rolls, a pan located below the same, a pair of fixed brackets in said pan at opposite ends thereof, an apron roller mounted in each pair of brackets, guideways extending lengthwise of said pan and located on opposite sides thereof, two supports movable upon said guideways respectively, a frame pivoted to said supports, a roller mounted in the outer end of said frame, a cable fixed to said frame and to the pan, an endless apron embracing the three rollers, and means for moving said supports along said guideways.

4. In combination with a pair of mixing rolls, two pairs of bearing brackets located in a plane below the mixing rolls, two guide rods extending between the pairs of bearing brackets, two supports respectively slidable upon said guide rods, a frame pivoted to said supports, an apron roller mounted in the outer end of said frame, rollers mounted in each of the pairs of brackets referred to, a cable secured at its ends to said frame and to a fixture, and means for sliding said supports along said guide rods, and an endless apron embracing the three rollers.

5. In combination with a pair of mixing rolls, two pairs of bearing brackets located in a plane below the mixing rolls, two guide rods extending between the pairs of bearing brackets, two supports respectively slidable upon said guide rods, a frame pivoted to said supports, an apron roller mounted in the outer end of said frame, rollers mounted in each of the pairs of brackets referred to, a cable secured at its ends to said frame and to a fixture,—each of said supports having a sleeve connected with it and embracing the associated guide rod, a rack having two eyes associated with each sleeve and slidably mounted thereon, a shoulder on each sleeve for engagement with the nearby rack eye, a spring interposed between each of said supports and the near by end of the rack, a shaft having pinions engaging with said racks; and means for turning said shaft in either direction, and an endless apron embracing said three rollers.

6. In combination with a pair of mixing rolls, two pairs of bearing brackets, two apron rolls mounted respectively in said pairs of brackets, two supports located near one pair of brackets, guideways for said supports, a frame pivoted to said supports, an apron roll mounted in the outer end of said frame, an endless apron which embraces said three rolls, a cable connected with said frame and with a fixture, a rack associated with each movable support, a spring interposed between each movable support and the nearby end of the rack, a shoulder connected with each support and adapted to be engaged by said rack, a shaft having pinions with which said two racks engage, and means for turning said shaft backward and forward.

7. In combination with a pair of mixing rolls, a pan located beneath said mixing rolls, a pair of fixed brackets in said pan at each end thereof, a roller mounted in each pair of brackets, two guide rods extending between and connected with the pairs of brackets referred to, two supports movably mounted on said guide rods respectively, a frame pivoted to said supports, a roller mounted in the free end of said frame, an endless apron which embraces said three rollers, a cable fixed to said frame and to the pan, a sleeve fixed to each of said supports and embracing the associated guide rod and having an outwardly projecting shoulder at its end, a rack associated with each support and having eyes which slidably embrace the sleeve which is fixed thereto, a shaft, pinions fixed thereto engaging with said two racks, a fluid pressure cylinder, and a rack connected with the piston thereof for engagement with a pinion upon said shaft.

8. In combination with a rubber mixing mill which includes two mixing rolls, of a pan secured below said mixing rolls and the following parts wholly supported by said pan, viz. two apron rolls, two arms pivoted to the pan on alined axes, a feed apron roll which is rotatably supported by said two arms, an endless feed apron which embraces said three rolls and may be caused to contact with one of the mixing rolls by swinging of said two arms about their supported axes, and means for tightening said apron, and thereby increasing the pressure of said apron against the mixing roll with which it contacts.

9. In combination with a rubber mixing mill which includes two mixing rolls, of a pan located below said mixing rolls, two apron rolls mounted in bearings supported by said pan, two arms pivoted to said pan on alined axes, a feed apron roll which is rotatably supported by said two arms, an endless feed apron which embraces said three rolls and may be caused to contact with one of the mixing rolls by the swinging of said two arms about their supporting axis, and means supported by said pan for yieldingly tightening said apron and thereby increasing the pressure upon said apron.

In testimony whereof I hereunto affix my signature in the presence of two witnesses.

PARK E. WELTON.

Witnesses:
HARRY A. WELTON,
J. E. WEISER.